(12) United States Patent
Gulhati et al.

(10) Patent No.: US 11,902,851 B2
(45) Date of Patent: Feb. 13, 2024

(54) SMART CORD FOR CORDED POWER TOOLS

(71) Applicant: STANLEY BLACK & DECKER INDIA PRIVATE LIMITED, Bangalore (IN)

(72) Inventors: Tushar Gulhati, Bangalore (IN); Ekta Singh, Bangalore (IN); Pravin Khardikar, Bangalore (IN); Latha Ramesh, Bangalore (IN)

(73) Assignee: STANLEY BLACK & DECKER INDIA PRIVATE LIMITED, Bangalore (IN)

( * ) Notice: Subject to any disclaimer, the term of this patent is extended or adjusted under 35 U.S.C. 154(b) by 384 days.

(21) Appl. No.: 16/621,986

(22) PCT Filed: Feb. 28, 2019

(86) PCT No.: PCT/IN2019/050166
§ 371 (c)(1),
(2) Date: Dec. 12, 2019

(87) PCT Pub. No.: WO2019/167074
PCT Pub. Date: Sep. 6, 2019

(65) Prior Publication Data
US 2021/0152972 A1 May 20, 2021

(30) Foreign Application Priority Data
Feb. 28, 2018 (IN) .............................. 201841007635

(51) Int. Cl.
*H04W 4/021* (2018.01)
*B25F 5/00* (2006.01)
(Continued)

(52) U.S. Cl.
CPC ............... *H04W 4/021* (2013.01); *B25F 5/00* (2013.01); *G01S 19/16* (2013.01); *H02J 7/04* (2013.01); *H02J 2207/20* (2020.01)

(58) Field of Classification Search
CPC ....... H04W 4/021; H04W 4/80; H04W 64/00; H04W 88/16; B25F 5/00; H02J 2207/22; H02J 7/04; G01S 19/16
See application file for complete search history.

(56) References Cited

U.S. PATENT DOCUMENTS 5,418,521 A 5/1995 Read
9,052,216 B2 6/2015 Kamel et al.
(Continued)

FOREIGN PATENT DOCUMENTS

DE 102005006358 8/2006
DE 102015221685 5/2017
(Continued)

OTHER PUBLICATIONS

Int'l Search Report dated, May 30, 2019 in PCT application PCT/IN2019/050166.
(Continued)

*Primary Examiner* — Jean A Gelin
(74) *Attorney, Agent, or Firm* — Amir R. Rohani

(57) ABSTRACT

A smart cord for a corded power tool comprising: a connectivity module connected to the corded power tool and to a power socket through an AC power cord; sensors electrically coupled with the corded power tool; a GPS module coupled with at least a location sensor for determining set of coordinates associated with the corded power tool; a switching device electrically coupled with a controller unit in the connectivity module; a user interface device in communication with the controller unit by a communication module. The controller unit performs: receiving input signals from
(Continued)

Figure 1:
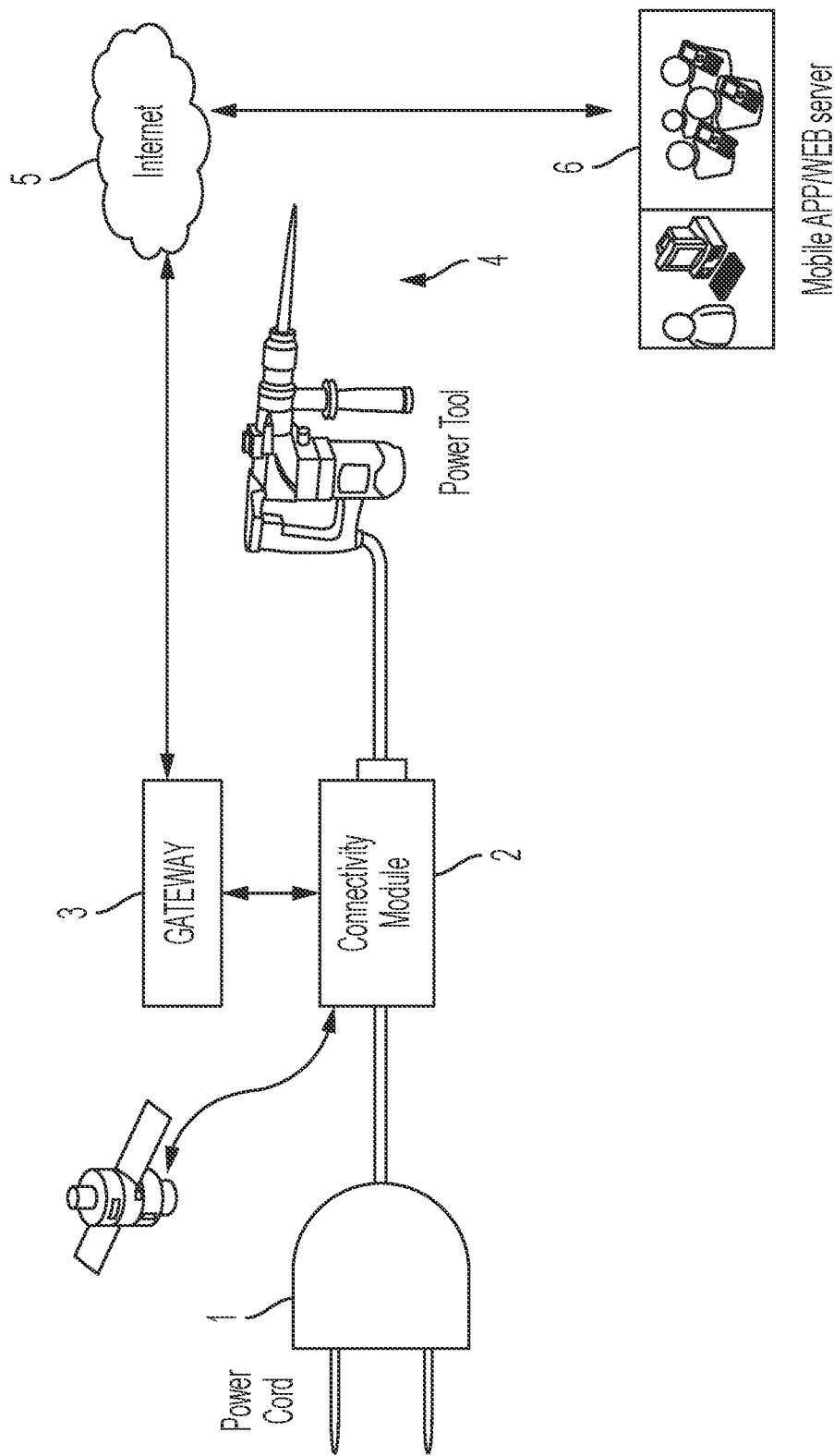

the sensors; determining based on the received input signals or set of coordinates, whether the received input signal exceeds a threshold parameter and/or the corded power tool is located inside a predetermined boundary area; and generating and transmitting an alert signal to the user interface device.

12 Claims, 4 Drawing Sheets

(51) Int. Cl.
G01S 19/16 (2010.01)
H02J 7/04 (2006.01)

(56) References Cited

U.S. PATENT DOCUMENTS

| 9,483,929 | B1 | 11/2016 | Auvenshine | |
|---|---|---|---|---|
| 2006/0195202 | A1* | 8/2006 | Brotto | B25F 5/00 |
| | | | | 700/83 |
| 2012/0139348 | A1 | 6/2012 | Dubose | |
| 2013/0201641 | A1 | 8/2013 | Soden | |
| 2014/0240125 | A1* | 8/2014 | Burch | B25H 3/02 |
| | | | | 340/539.13 |
| 2014/0340207 | A1* | 11/2014 | Priest, III | G08B 23/00 |
| | | | | 340/407.1 |
| 2016/0311094 | A1 | 6/2016 | Mergener et al. | |
| 2016/0209899 | A1* | 7/2016 | Brantner | H04L 12/12 |
| 2017/0149180 | A1 | 5/2017 | Siegler | |
| 2018/0041072 | A1* | 2/2018 | Clifton | H02J 15/00 |
| 2018/0115130 | A1* | 4/2018 | Truluck | H01R 13/6691 |
| 2019/0227528 | A1* | 7/2019 | Abbott | G06N 20/00 |
| 2019/0387942 | A1* | 12/2019 | Truitt | A47L 9/2826 |
| 2021/0266718 | A1* | 8/2021 | Vetter | H04W 4/80 |

FOREIGN PATENT DOCUMENTS

| DE | 102016201454 | 8/2017 |
|---|---|---|
| WO | 2002097754 | 12/2002 |
| WO | 2016033531 | 3/2016 |
| WO | 2017105339 | 6/2017 |

OTHER PUBLICATIONS

EP EESR dated Nov. 24, 2020 in corresponding EP application No. 19760251.9.

* cited by examiner

# SMART CORD FOR CORDED POWER TOOLS

RELATED APPLICATION

This application is a national stage of PCT International Application No. PCT/IN2019/050166 filed Feb. 28, 2018, which claims priority to Indian Patent Application No. 201841007635 filed Feb. 28, 2018, contents of both of which are incorporated herein by reference in entirety.

TECHNICAL FIELD

The present disclosure relates to a smart cord for corded power tools that helps to monitor usage pattern; health of tool; real time location of tool and to do predictive service and preventive maintenance, thus reducing down-time of tool and helps user to do inventory management on an application/web and stores the data in the device and cloud.

BACKGROUND OF THE DISCLOSURE

It is well known that modern manufacturing techniques deploy a number of portable tools to tackle the repetitive jobs that are encountered in the shop floor of an industry. Tools like (grinders, hammers, chop saws, sanders, polishers etc.) find extensive use in large fabrication shops, tool rooms, and fettling shops. In addition, such tools also find large usage as do-it-yourself (DIY) tools in the hands of the individuals in domestic applications. Over its life, due to continuous wear and tear such tools require regular maintenance. The main requirements of such tools are portability, ease of handling and usage, safety, high efficiency, minimum downtime and optimum power output.

U.S. Pat. No. 7,740,425 B2 discloses a product accessory, such as, for example, a drill bit for a power drill, a saw blade for a power reciprocating saw or for a circular saw, etc., that may be equipped with some structure or means to communicate with the power tool in order to improve performance and/or to set performance characteristics, such as, for example, drilling rates, cutting speeds, etc. The accessory is capable of communicating with a power tool and an inventory system, and includes a body including a connecting portion for connecting the accessory to the power tool and a communication member positioned on the body for communicating with the power tool and the inventory system, wherein the communication member is an RFID component and a WI-FI component. However, this design has drawbacks such as it is an expensive solution to incorporate because accessories like drill bits etc. can break easily/get lost and have short life. Further, it has the drawback on tools being used in industrial environment as the communication with tool is hindered due to contamination of grease, dust etc. Furthermore, as it is tool specific therefore it needs smartness in the tool as well to control its parameters for example—the drill bit can control the motor for drilling speed only if the tool has the hardware to allow for it, thus, it is not a universal retro-fit solution.

U.S. 20150084433 A1 discloses a standalone power cord with a smart control module. The smart control module controls operation of an electrical appliance. The electrical appliance is controlled by a request initiated by a user. The smart control module enables switching ON and OFF the electrical appliance based on the request. Further, the smart control module fine-controls at least one of a plurality of parameters of the electrical appliance by changing the internal setting, thereby achieving fine-control of the electrical appliance. The smart control module includes a smart link interface compliant-power cable (SLIC-P) module and a smart link interface compliant-socket (SLIC-C) module. The SLIC-P module enables switching ON and switching OFF the electrical appliance. The SLIC-C module enables the standalone power cord to fine-control one or more parameters of the electronic appliance. However, the smart control module enables the switching ON and OFF the electrical appliance based on the request and controls at least one of a plurality of parameters (temperature, speed, brightness and volume) of the electrical appliance by varying the internal settings of the electrical appliance. Also, the design uses only NFC (near field communication) as a wireless communication. One of the limitations associated with the disclosed prior art is that it is not competent enough to work remotely. Another limitation associated with this is that it does not involve in doing the predictive and preventive maintenance and determining the real time location of the portable assets/tools.

KR20120037551A discloses a power management apparatus and a power management system having the same, and a control method thereof are provided to automatically sense the change of electrical machinery connected to a smart socket which measures power consumption of the electrical machinery. A power management apparatus (300) receives electricity price and price level corresponding to the electricity price from smart meter (200). The power management apparatus receives power consumption of electrical machinery (500A, 500B) by communicating with smart sockets (400A, 400B). The power management apparatus establishes a drive schedule of the electrical machinery based on the price level of a power supply and the power consumption of the electrical machinery. Thus, it only measures the power consumption of the electrical machinery by communicating with the smart socket. The design is solely for power/energy management. One of the problems associated with the disclosed prior art is that it is not competent enough for doing the predictive services and preventive maintenance or determining the real time location of the portable assets/tools.

US2018004263A1 discloses a system for the recording and analysis of use of electrical or mechanical cords involving connection to electronics devices, such as a phone, tablet laptop or passenger control unit. The system includes a cord reel having a memory which can be connected to an electronic device such as a phone, tablet laptop or passenger control unit to receive information related to the use of the cord reel and to create records therefrom so as to provide information to authorized personnel. Thereby, it only provides a method for anticipating the need for replacement of such devices prior to failure. The prior art discloses standalone power cord, product accessory and smart socket/cord/cord reel system to provide the information of the electrical appliance connected therefrom. This prior art primarily focuses on mapping parameters of cord reel itself and not the electronic device connected to it.

US20140240125A1 discloses a power distribution box including a power input configured to receive power from an external power source, an alternating current (AC) output electrically coupled to the power input, a power-line adapter and a gateway device. The power-line adapter is coupled to the power input and configured to receive power via the power input and communicate with an external network. The gateway device is coupled to the power-line adapter and is configured to communicate with the external network. The gateway device includes a wireless network module configured to communicate with at least one power tool device in a wireless network, and a translation controller configured to enable communications between the wireless network module and the external network through the power-line adapter. This prior art primarily focuses on a power distribution box that houses a gateway to wirelessly track cordless and corded power tools that have a tracking unit inbuilt or mounted on the tools and then display the data related to it on a mobile application. One of the problems associated with it is that it does not enable the user to monitor parameters of the tool such as doing predictive service and preventive maintenance. Another problem associated with it is that it does not provide the real time location of tool, usage pattern, health of tool and do inventory management on an application.

Therefore, the present disclosure is directed to overcome one or more of the problems as set forth above.

OBJECT OF THE INVENTION

The object of the present invention is to provide a smart cord that reduces down-time and cost by helping to manage predictive and preventive service and maintenance plans. In time service and maintenance; tool abuse (drop & overload) protection helps to increase life of tool and customer satisfaction. Real-time monitoring health of power tools helps to prevent theft/misuse of a corded power tool.

SUMMARY OF THE DISCLOSURE

The present disclosure provides a smart cord for a corded tool. The smart cord for a corded power tool comprises a connectivity module connected to the corded power tool at one end and to a power socket through an ac power cord at the other end; a plurality of sensors electrically coupled with the corded power tool; a GPS module coupled with at least a location sensor for determining set of coordinates associated with the corded power tool; a switching device electrically coupled with a controller unit in the connectivity module, and configured to cause interruption in power supply in response to an alert signal from the controller unit. The smart cord further includes a user interface device in communication with the controller unit by a communication module. The controller unit is configured to receive input signals from a plurality of sensors and to determine based on the received input signals, whether the received input signal exceeds a threshold parameter and/or determine based on the set of coordinates whether the corded power tool is located inside a predetermined boundary area or outside the predetermined boundary area. The controller unit further generates and transmits an alert signal to the user interface device.

In an embodiment of the present disclosure, the ac power cord is a single phase or a three-phase power cord.

In another embodiment of the present disclosure, the connectivity module comprises: a battery adapted to produce a battery voltage; an AC-DC converter electrically connected to the battery for recharging the battery; a low dropout (LDO) regulator electrically connected to the battery and adapted to provide a constant supply voltage from the battery to the control unit; and a memory card for storing data from the plurality of sensors.

In yet another embodiment of the present disclosure, the plurality of sensors is selected from the group consisting of fuel gauge sensor, current sensor, inertial motion sensor unit, voltage sensor, location sensor and pressure sensor.

In an embodiment of the present disclosure, the user interface device is selected from the group consisting of a mobile phone, a tablet, a computer, or other electronic information device.

In another embodiment of the present disclosure, the communication module is selected from the group consisting of a Wi-Fi module, a Bluetooth module, a NB-IoT module, a cellular-2G/3G/4G module, a low power wireless area networks such as LoRa and a combination of one or more modules with GPRS or GPS.

In still another embodiment of the present disclosure, the memory is an auxiliary memory.

Other features and aspects of this disclosure will be apparent from the following description and the accompanying drawings.

BRIEF DESCRIPTION OF ACCOMPANYING DRAWINGS

FIG. 1: System Architecture of corded power tool with smart cord.

Figure 2:
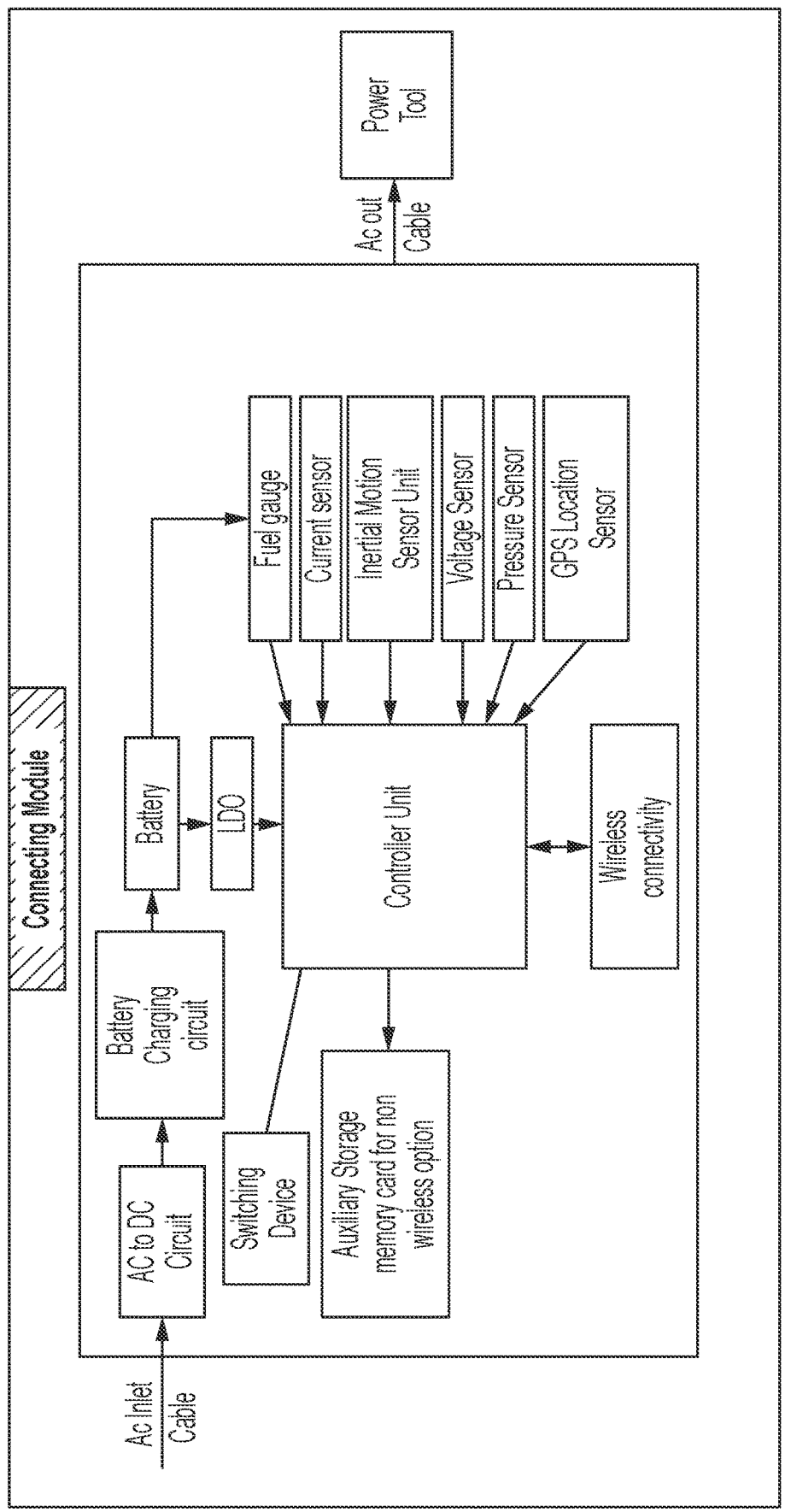

FIG. 2: Block diagram for illustrating the components of smart cord connectivity module FIG. 3: Mobile/Web Application Outlook to explain the features.

Figure 4:
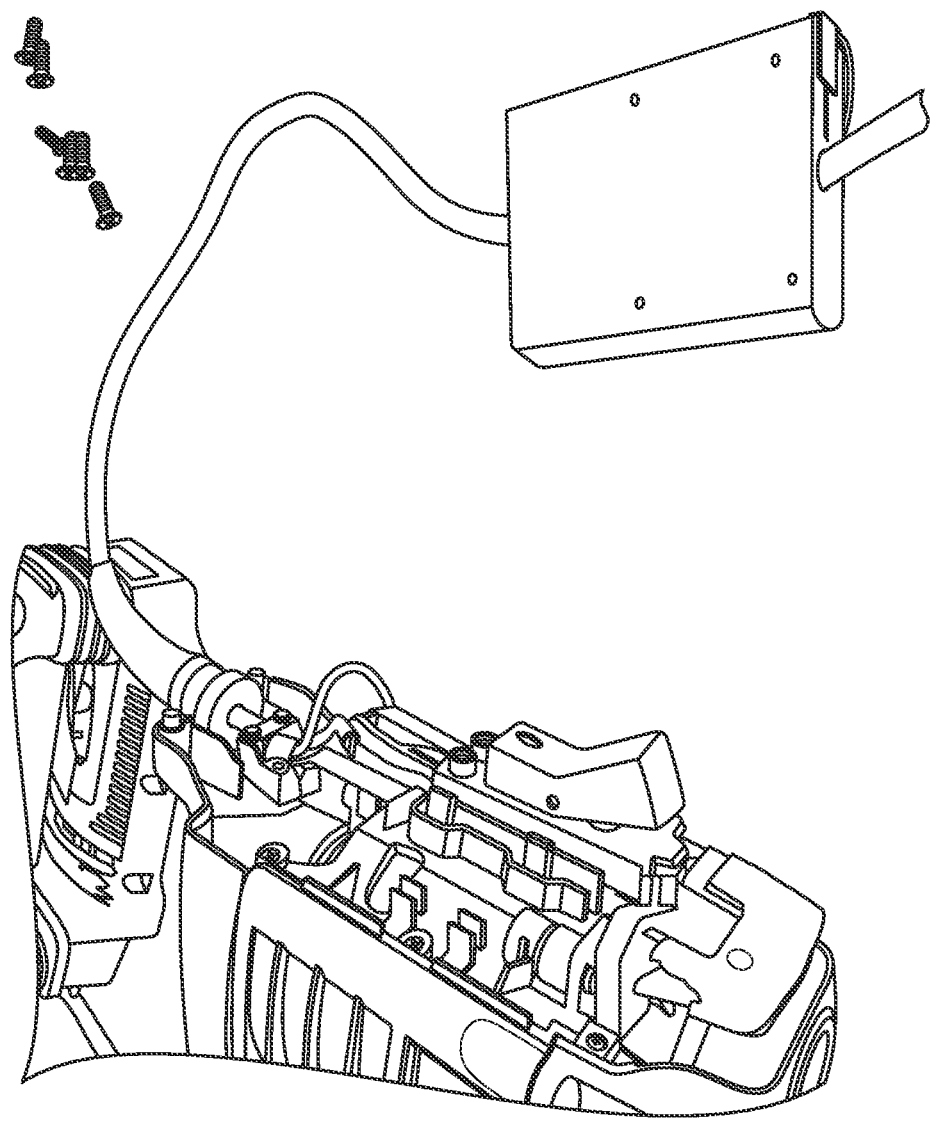

FIG. 4: Prototype Image of corded tool with smart cord.

DETAILED DESCRIPTION OF THE DISCLOSURE WITH REFERENCE TO DRAWINGS

Provided below is a non-limiting exemplary embodiment of the present disclosure and a reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claim.

FIGS. 1 and 2 illustrate a system architecture and components of smart cord connectivity module (2), according to an embodiment of the present disclosure. The smart cord for a corded power tool (4) comprises an AC power cord (1) single phase or 3 phase that is connected to a smart connectivity module (2). One end of smart cord is connected to a corded tool (4) and other end to a power socket for AC power.

The smart cord of the present invention consists essentially of a pressure sensor, a current sensor, a fuel gauge sensor, an inertial motion sensor (accelerometer-gyroscope-magnetometer), a temperature sensor, a voltage sensor and a global positioning system (GPS) location sensor which are used to map parameters of corded power tool (4) attached to it.

The pressure sensor helps to determine on which floor within the industry or facility, the tool is operating. The current sensor will map the usage of tool and define the state of tool. This will help the user to understand the idle hours of tool and its usage pattern and plan its resources well thereby increasing productivity. The fuel gauge sensor checks the battery life and triggers the algorithm to prevent overcharging of the battery. The battery will also work when tool does not have an AC power through cord, for tracking.

Motion sensors, such as inertial sensors like accelerometers or gyroscopes, are used in the corded power tool. Accelerometers can be used for measuring linear acceleration and gyroscopes can be used for measuring angular velocity of the corded power tool. Global positioning system (GPS) and location-based service (LBS) applications rely on determining an accurate location of the device, and motion sensors are often needed when a GPS signal is attenuated or unavailable, or to enhance the accuracy of GPS location finding.

Exemplary embodiments of the present invention are directed to an apparatus for performing location analysis of a corded power tool (4). A GPS coupled with at least a location sensor for determining set of coordinates associated with the corded power tool (4). A set of coordinates (e.g., longitude and latitude) is received at the controller and associated with a boundary area. A position of the tool is obtained. Based upon the received coordinates and the detected position of the tool, it is determined whether the tool is located inside the boundary area or outside the boundary area. Next, an alert signal is generated and transmitted if the result of the determining step is different from an immediately previous result obtained.

Temperature sensor in a tool is calibrated to ensure their accuracy, by heating up the tool to a known temperature. The output of the temperature sensors is then compared with an expected temperature to determine an error in the sensor output.

The primary function of voltage sensors is to detect and measure AC and/or DC voltage levels. When the presence of voltage is detected, the sensors provide an output in the form of analogue voltage signals, current levels, frequency and modulated frequency outputs or audible sounds.

The switching device can be controlled by interrupting the power in a simple-to-learn, predetermined manner.

The controller unit (3) comprises a processor/microcontroller and is taking inputs from plurality of sensors/peripherals, performing the calculations within the module and determine based on the received input signals, whether the received input signal exceeds a threshold parameter and/or determining based on the set of coordinates whether the corded power tool (4) is located inside a predetermined boundary area or outside the predetermined boundary area.

The calculations are done in the gateway/controller unit (3) to compare the input data with preset thresholds and trigger events (alert signal) to a user interface device (6).

As employed herein, the term "gateway/controller unit" shall expressly include, but not be limited by, any node on any communication network that serves as an entrance and/or exit to and/or from one or more other communication networks that use different operational protocols. The controller unit can be a processor/microcontroller that is taking the inputs from various sensors/peripherals, performing the calculations within the module or computing in the gateway with raw data and sending this raw/reformed data to a cloud through a wireless connectivity module (2).

As employed herein, the term "user interface device" shall expressly include, but not be limited by, any communicating module having a user input and/or output interface and a wireless communication port (e.g., without limitation, a wireless communicating device; a personal computer (PC); a data phone; a remote control, dispatch or monitoring center; a portable wireless communicating device).

The communication module (5) in the present disclosure shall expressly include, but not be limited by a Wi-Fi module, a Bluetooth module, a narrowband internet of thing (NB-IoT) module, a cellular-2G/3G/4G module, a low power wireless area networks such as long range (LoRa) module and a combination of one or more modules with general packet radio services (GPRS) or GPS.

As employed herein, the term "wireless communication network" means a communication network employing wireless communications.

As employed herein, the term "wired communication network" means a communication network employing non-wireless, wired communications.

In accordance with the embodiments herein, FIG. 2 (with reference to FIG. 1) illustrates a connectivity module (2) comprising an AC-DC converter electrically connected to the battery for recharging the battery, a battery charging circuit, a battery adapted to produce a battery voltage and a low drop out (LDO) regulator operatively connected to the battery and adapted to provide a constant supply voltage from the battery voltage to a controller unit. If the battery is fully charged the charging algorithm is so designed to power the connectivity module (2) directly without overcharging the battery.

In accordance with the embodiments herein, a memory card is provided which function as auxiliary storage for data.

Figure 3:
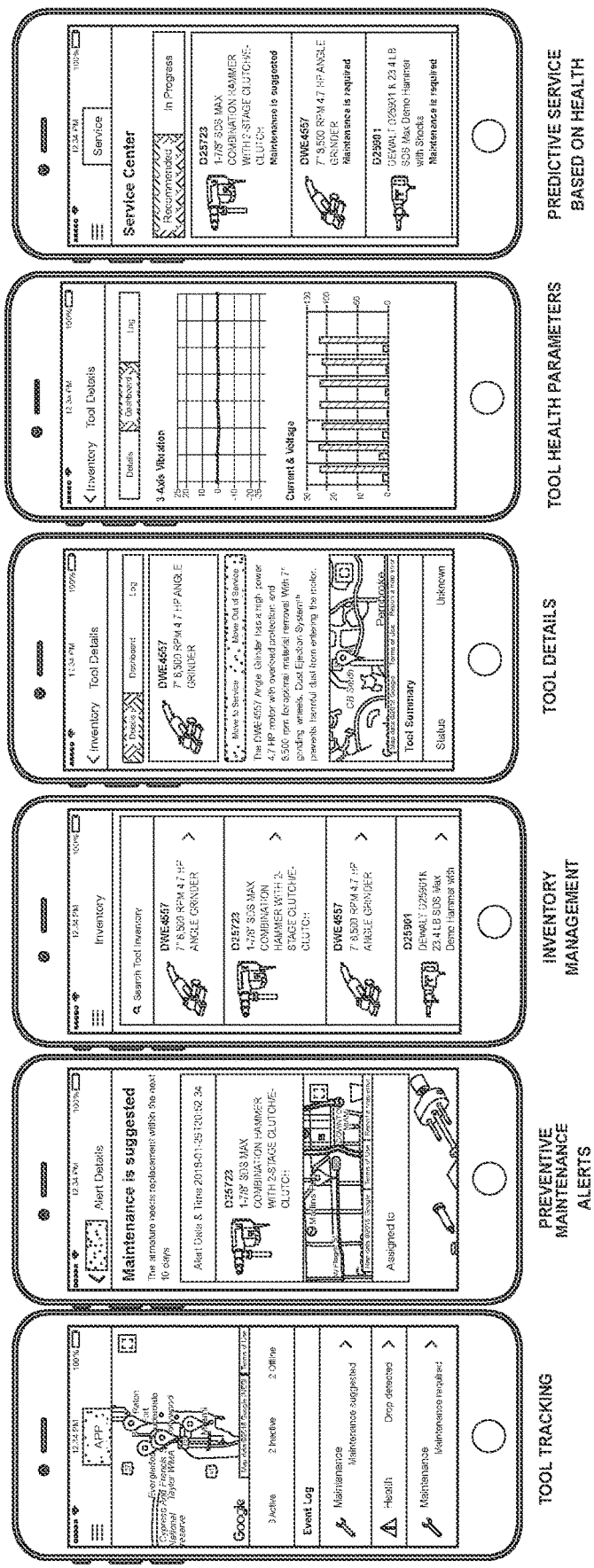

In accordance with the embodiments herein, FIG. 3 (with reference to FIGS. 1 & 2) illustrates a mobile/web application outlook to explain the features. In cases where wireless connectivity is Bluetooth/NFC/barcode/QR code that does not give real time tracking, a memory card will store the locations in regular intervals and push to gateway through a user interface device when in range. In case of real time connectivity modules being used such as NB IoT, LoRa, 2G, 3G, 4G (cellular), CAT M1 cellular services, Ultra-Wideband UWB platforms and many others, Google map location/geo-coordinates—latitude and longitude of a tool could be seen on a user interface device upon an interrupt (wake up request) triggered by the authorized personnel through a button on the application on one's mobile phone/tablet etc. thus enabling real time tracking of tool. Also, it would give an added advantage to geofence the tools/assets. All these features will prevent theft and help user to manage his inventory well.

Also, the usage hours coupled with an accelerometer and a gyroscope data that is useful to determine vibration of tool, in turn helps to determine the life of different components in the tool and the health of tool. With this data in cloud timely service alerts and automatic maintenance alerts will be generated that help to increase life of tool and thus reduce cost impact.

These notifications with cost impact and savings would be published to user and would thus help the authorized personnel to manage and lower one's operational and maintenance costs.

The voltage sensors help to prevent putting a low voltage tool to a high voltage socket and vice versa thus maintaining optimum and proper operation of tool. The voltage and current graphs would also provide a real-time data of power consumption of tool and will help in understanding the future requirements of users.

This apparatus in addition would help the service teams to trouble shoot the problems in tool through the log in the module or even remotely at times.

Advantages

In an embodiment, the disclosed smart cord prevents loss/theft of tool and real time tracking with geofencing alerts on phone, tablet or web application.

In an embodiment, the disclosed smart cord helps in predictive service & preventive maintenance of tool thus improving life of a tool.

In an embodiment, the disclosed smart cord reduces down-time by increasing productive hours by proper inventory management and by monitoring man hours.

In an embodiment, the disclosed smart cord helps provide tool data to the authorized personnel at his convenience (location and time).

In an embodiment, the disclosed smart cord has battery backup to locate the tool when tool is not powered on.

In an embodiment, the disclosed smart cord helps the service teams to troubleshoot the problems during service through voltage and current graph plots logged in module or cloud remotely.

In an embodiment, the disclosed smart cord helps the authorized personnel to understand the optimum operating conditions e.g.: correct amount of pressure for grinding so that the life of grinding wheel and tool is maximized through current consumption characteristics.

In an embodiment, the disclosed smart cord prevent tool getting faulty by human errors like plugging a low voltage tool to a high voltage socket or not using it in correct manner/abusing the tool (drop of tool). This would also help to reduce any false warranty claims for company.

In an embodiment, the disclosed smart cord helps authorized personnel to understand exact power consumption thus saving the cost so that they can identify various applications with similar power requirements where tool can be used.

In an embodiment, the disclosed smart cord is robust and low-cost solution.

INDUSTRIAL APPLICABILITY

The smart cord can be used for any type of corded power tool to track and monitor its health. These types of corded power tools are generally used in construction, manufacturing industries and workshops.

While aspects of the present invention have been particularly shown and described with reference to the embodiments above, it will be understood by those skilled in the art that various additional embodiments may be contemplated by modification of the disclosed device without departing from the scope of what is disclosed. Such embodiments should be understood to fall within the scope of the present invention as determined based upon claims and any equivalents thereof.

We claim:

1. A smart cord for a corded power tool, comprising:
a connectivity module having a housing provided outside the power tool that is connected to the corded power tool via an Alternating Current (AC) outlet cable at one end and to a power socket through an Alternating Current (AC) power cord at the other end;
a plurality of sensors disposed within the housing of the connectivity module;
a GPS module disposed within the housing of the connectivity module and coupled with at least a location sensor for determining a set of coordinates associated with the corded power tool; and
a switching device electrically coupled with a controller unit in the connectivity module, and configured to cause interruption in power supply in response to an alert signal from the controller unit; and
a user interface device in communication with the controller unit by a communication module;

wherein the controller unit is configured to execute steps comprising:
receiving input signals from the plurality of sensors;
determining based on the received input signals whether an operational parameter associated with the corded power tool exceeds a threshold parameter;
determining based on the set of coordinates whether the corded power tool is located inside a predetermined boundary area or outside the predetermined boundary area; and
generating and transmitting an alert signal to the user interface device and to the switching device to cause interruption in the power supply if the set corded power tool is determined to be outside the determined boundary area.

2. The smart cord of claim 1, wherein the AC power cord is a single phase or a three-phase power cord.

3. The smart cord of claim 1, wherein the connectivity module comprises:
a battery adapted to produce a battery voltage;
an AC-DC converter electrically connected to the battery for recharging the battery;
a low dropout (LDO) regulator electrically connected to the battery and adapted to provide a constant supply voltage from the battery to the control unit; and
a memory card for storing data from the plurality of sensors.

4. The smart cord of claim 1, wherein the plurality of sensors comprises at least one of a fuel gauge sensor, a current sensor, an inertial motion sensor unit, a voltage sensor, a location sensor, and/or a pressure sensor.

5. The smart cord of claim 1, wherein the user interface device comprises at least one of a mobile phone, a tablet, a computer, and/or an electronic information device.

6. The smart cord of claim 1, wherein the communication module comprises a Wi-Fi module, a Bluetooth module, a narrow band internet of thing (NB-IoT) module, a cellular module, a wireless area networks, and/or a module including GPRS or GPS.

7. The smart cord of claim 3, wherein the memory card is an auxiliary memory unit.

8. The smart cord of claim 1, further comprising a battery disposed within the housing of the connectivity module, wherein the battery is rechargeable and provides a constant supply voltage to power the control unit and the GPS module to enable tracking of the smart cord even when no AC power is supplied through the AC power cord.

9. The smart cord of claim 1, wherein the plurality of sensors comprises a pressure sensor adapted to determine on which floor within a facility the corded power tool is operating.

10. The smart cord of claim 1, wherein the plurality of sensors comprises a current sensor electrically coupled to the corded power tool via the AC outlet cable and adapted to map a usage of the corded power tool or define a state of the corded power tool.

11. The smart cord of claim 1, wherein the plurality of sensors comprises a voltage sensor electrically coupled to the corded power tool via the AC outlet cable.

12. The smart cord of claim 1, wherein the plurality of sensors comprises a motion sensor adapted to enhance an accuracy of the set of coordinates determined by the GPS module.

* * * * *